(12) United States Patent
Vennemeyer et al.

(10) Patent No.: US 6,705,083 B2
(45) Date of Patent: Mar. 16, 2004

(54) MASTER CYLINDER HAVING A COMPACT PROFILE

(75) Inventors: Alfred Carl Vennemeyer, Englewood, OH (US); Frank Gerard Pirrello, Dayton, OH (US); William Dale Cornwell, Beavercreek, OH (US)

(73) Assignee: Delphi Technologies, Inc., Troy, MI (US)

( * ) Notice: Subject to any disclaimer, the term of this patent is extended or adjusted under 35 U.S.C. 154(b) by 48 days.

(21) Appl. No.: 10/210,709

(22) Filed: Jul. 31, 2002

(65) Prior Publication Data

US 2003/0024385 A1 Feb. 6, 2003

Related U.S. Application Data (60) Provisional application No. 60/308,889, filed on Jul. 31, 2001.

(51) Int. Cl.$^7$ ................................................. B60T 11/26
(52) U.S. Cl. ...................... 60/585; 92/169.1; 29/888.06
(58) Field of Search .................... 60/585, 581, 592, 60/589; 92/169.1; 29/888.06

(56) References Cited

U.S. PATENT DOCUMENTS

| | | |
|---|---|---|
| 3,937,020 A | 2/1976 | Bierlein et al. |
| 4,122,596 A | 10/1978 | Fields |
| 4,409,460 A | 10/1983 | Nishii et al. |
| 4,434,619 A | 3/1984 | Kobayashi |
| 4,445,334 A | 5/1984 | Derrick |
| 4,688,382 A * | 8/1987 | Farr .............................. 60/589 |
| 5,319,849 A * | 6/1994 | Bloecker .................. 29/888.06 |
| 5,590,527 A | 1/1997 | Shaw |
| 5,604,969 A | 2/1997 | Coop |
| 5,899,068 A * | 5/1999 | Nishii et al. ................... 60/585 |
| 5,960,630 A * | 10/1999 | Nishii et al. ................... 60/585 |
| 5,988,767 A | 11/1999 | Inoue et al. |
| 6,296,324 B1 | 10/2001 | Nishii et al. |
| 6,349,806 B1 | 2/2002 | Takayama et al. |
| 6,381,959 B1 | 5/2002 | Tsubouchi et al. |

* cited by examiner

Primary Examiner—Edward K. Look
Assistant Examiner—Igor Kershteyn
(74) Attorney, Agent, or Firm—Michael D. Smith (57) ABSTRACT

The subject invention provides a master cylinder having a compact profile. In particular, the master cylinder comprises a hollow body having a continuous outer wall with a continuous thickness. An end wall is integrally formed with the outer wall at a first end to close an end of an integrally formed bore. A number of apertures are formed within the outer wall to provide fluid communication between the outer wall and the bore. A flange is also integrally formed with the outer wall at a second end to define a fully integrated master cylinder. The outer wall further includes thickened sections extending between an inner surface of the bore and a mounting surface with the thickened sections being at least 30 percent smaller than the inner diameter of the bore for providing the compact profile of the integrated master cylinder.

52 Claims, 8 Drawing Sheets

MASTER CYLINDER HAVING A COMPACT PROFILE

RELATED APPLICATION

This patent application claims priority to and all the benefits of U.S. Provisional Ser. No. 60/308,889 filed on Jul. 31, 2001.

BACKGROUND OF THE INVENTION

1. Field of the Invention

The subject invention relates to master cylinders for automotive brake assemblies and more specifically to an improved master cylinder having a compact profile.

2. Description of the Prior Art

Master cylinders for automotive brake assemblies are well known in the art. The master cylinders typically have a hollow body defining an inner bore which receives primary and secondary pistons. Brake fluid is passed into and out of the bore by actuation of the pistons to facilitate a hydraulic braking system. In particular, selective movement of a brake pedal moves the primary and secondary pistons within the bore and develops elevated hydraulic pressure which is transmitted to vehicle wheel cylinders or calipers causing the brakes to be applied. The master cylinder therefore provides the function of responding to an application of force through the brake pedal to build pressure in the hydraulic braking system. Additionally, the master cylinder controls the flow of fluid between the brake hydraulic system and a reservoir.

A typical master cylinder is generally combined with a hydraulic or vacuum operating power booster. The power booster assists in increasing the amount of force applied to the master cylinder's pistons through a push-rod upon actuation of the brake pedal. Therefore, the master cylinder is generally constructed of a rigid structural material sufficient to carry the load imposed thereon by the push-rod. In particular, master cylinders have generally been formed of a cast iron or cast aluminum. Examples of cast iron or cast aluminum master cylinders are shown in U.S. Pat. Nos. 3,937,020 and 5,604,969. The cast iron or cast aluminum master cylinders are then machined to meet design requirements. The finish machining is a time consuming and expensive process that often unveils porosity, which interrupts surface smoothness and can create leaks in the braking system.

One improvement to the cast iron or cast aluminum master cylinders is set forth in U.S. Pat. No. 5,590,527, wherein the body of the master cylinder is linear extruded. The linear extruded master cylinder has certain manufacturing and assembly advantages. However, due to the limitations associated with linear extrusions, the end wall and flange must be separately mounted to the extruded body. This adds to the overall cost of assembling the master cylinder. In addition, the profile of the master cylinder, as viewed in cross-section, is substantially asymmetrical which prevents the master cylinder from be manufactured by other more efficient techniques such as impact extrusion.

Impact extrusion typically places a lubricated slug of material into a die and then the slug is struck with a punch. The material is forced into conforming with the die and the punch which produces the desired configuration. Impact extrusion, however, requires that the final product have a compact profile. Products with substantial asymmetric profiles cannot the formed by this process. Hence, the prior art master cylinders have not been able to be formed by this process.

Accordingly, it would be desirable to provide a master cylinder that does not suffer from the deficiencies associated with cast iron, cast aluminum, or linear extruded master cylinders yet maintains the necessary structural integrity to withstand the loads imposed thereon. Even more preferably, it would be desirable to develop a master cylinder which has a compact profile that can be formed by an impact extrusion process.

SUMMARY OF THE INVENTION AND ADVANTAGES

The subject invention provides a master cylinder having a compact profile. In particular, the master cylinder comprises a hollow body having a continuous outer wall extending between first and second ends to define a longitudinal bore formed between the ends. The outer wall has a continuous thickness between the ends when viewed in cross-section and further defines at least one mounting surface on an exterior thereof. The longitudinal bore has an inner diameter defining an inner surface. An end wall is integrally formed with the outer wall at the first end to close an end of the bore. At least one aperture is formed within the outer wall at the mounting surface to provide fluid communication between the outer wall and the bore. A flange is integrally formed with the outer wall at the second end to define a fully integrated master cylinder. The outer wall further defines at least one thickened section extending between the inner surface of the bore and the mounting surface with the thickened section being at least 30 percent smaller than the inner diameter of the bore for providing the compact profile of the integrated master cylinder.

The subject invention also provides for a method of manufacturing a master cylinder having the hollow body with the end wall and the flange. The method comprises the steps of: extruding the hollow body to define a continuous outer wall extending between first and second ends having a longitudinal bore formed between the ends; forming the end wall on the first end of the outer wall simultaneously with the extrusion of the hollow body to close an end of the bore; positioning the flange over at least a portion of the second end of the outer wall; deforming a distal portion of the second end of the outer wall; and interlocking the second end of the outer wall with the flange during the deforming of the distal portion to integrally mount the flange to the hollow body.

Accordingly, the subject invention provides for a master cylinder having a compact profile such that the master cylinder, having the end wall and flange, may be completely formed from an efficient impact extrusion process. In addition, the subject invention provides for a unique method of attaching a flange to the body of the master cylinder. The master cylinder of the subject invention can therefore be efficiently manufactured, with less material, cost, and weight, easily assembled, and has sufficient structural integrity to withstand the loads imposed thereon.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
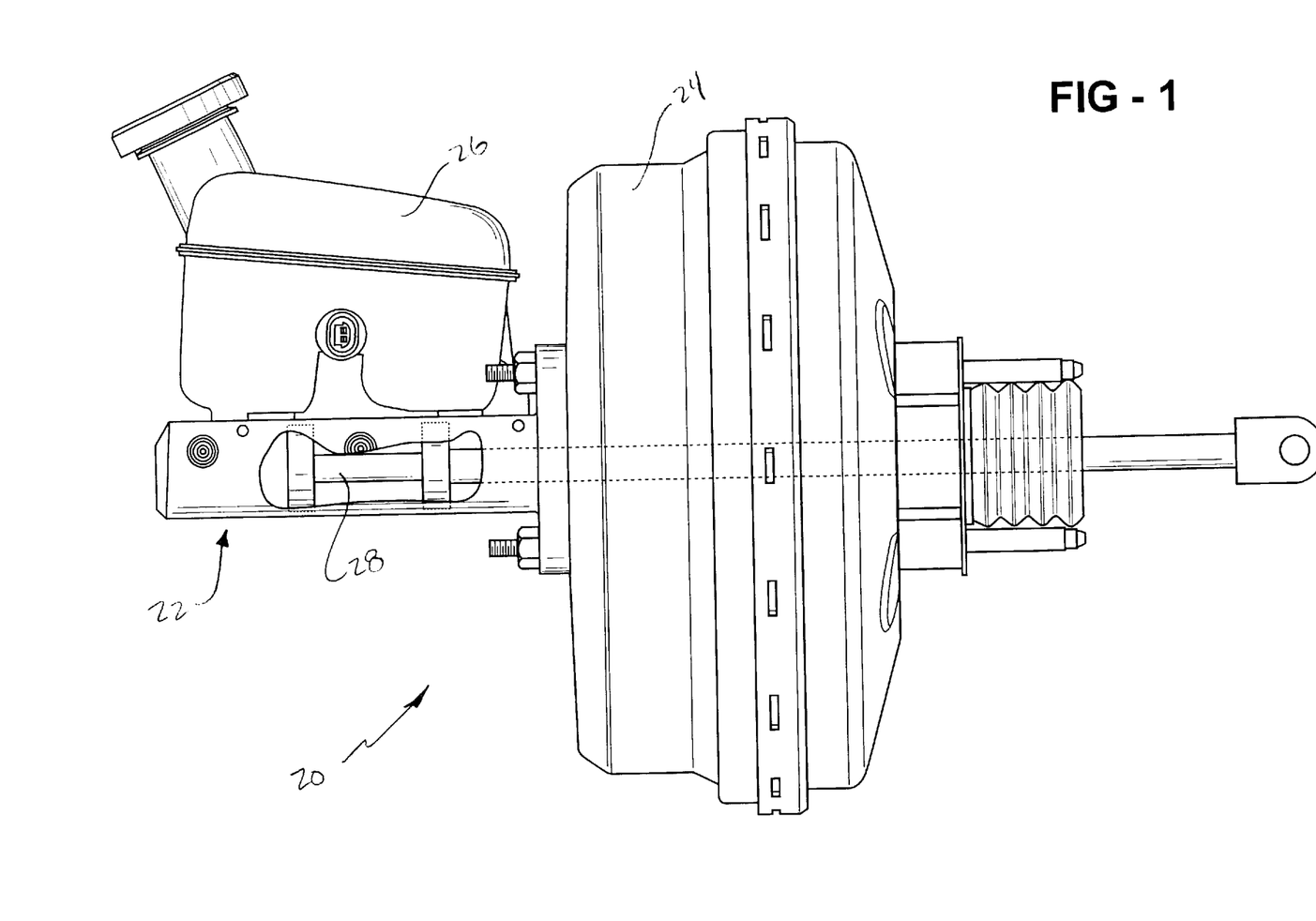
FIG. 1 is side view of a braking system incorporating a master cylinder in accordance with the subject invention.
Figure 2:
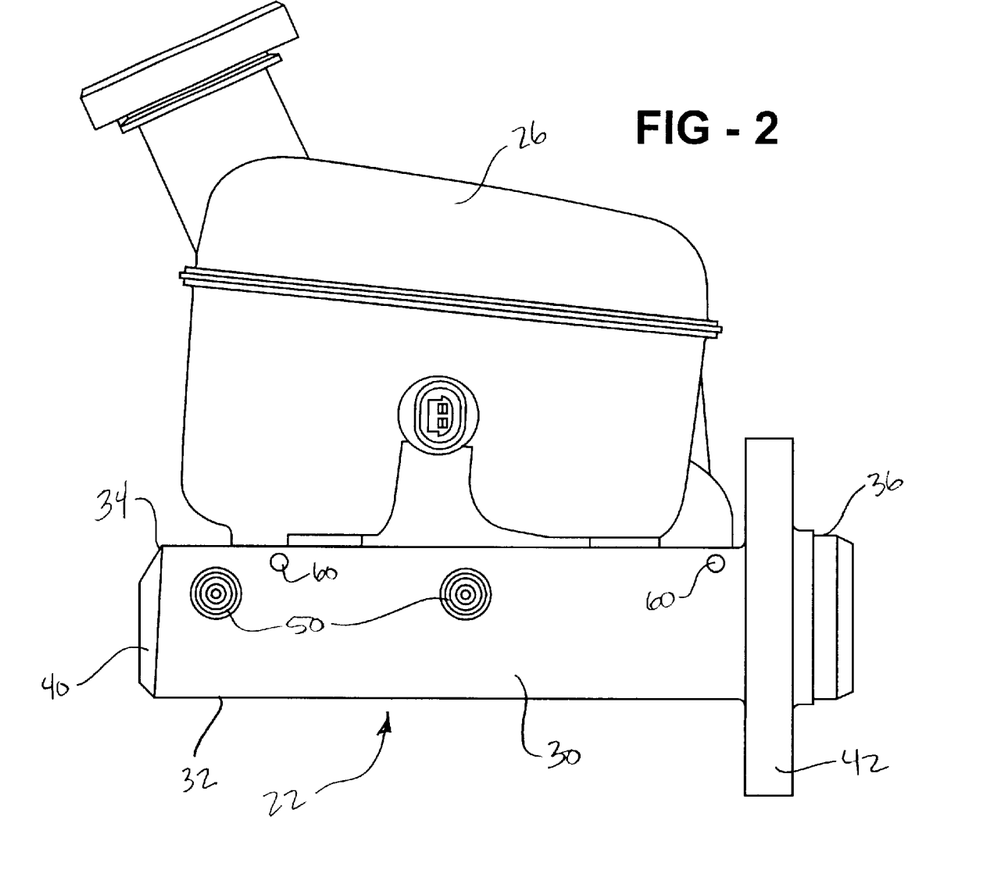
FIG. 2 is a side view of the master cylinder having a reservoir attached thereto.

Referring to the Figures, wherein like numerals indicate like or corresponding parts throughout the several views, a braking system is generally shown at 20 in FIG. 1. The braking system 20 includes a master cylinder 22 connected to a brake booster 24. A reservoir 26 is mounted to the master cylinder 22 for providing hydraulic brake fluid to the master cylinder 22. Outlet hydraulic fluid lines (not shown) are also connected to the master cylinder 22 for transporting pressurized hydraulic brake fluid to brake cylinders or calipers (now shown). At least one piston 28, and preferably primary and secondary pistons 28, are disposed within the master cylinder 22 for moving the hydraulic fluid into and out of the master cylinder 22 as is known in the art. The operation of the braking system 20 having the master cylinder 22, as discussed briefly above, is known to those skilled in the art. As such, further details and operation of the braking system 20 will not be discussed in any greater detail.

Referring also to FIGS. 2–6B, one embodiment of the master cylinder 22 is shown in greater detail. As is immediately evident, the master cylinder 22 has a compact profile which provides numerous advantages as discussed below. The master cylinder 22 comprises a hollow body 30 having a continuous outer wall 32 extending between first 34 and second 36 ends. The outer wall 32 has a continuous thickness between the ends 34,36 when viewed in cross-section, see FIG. 4.

A longitudinal bore 38 is defined by the outer wall 32 between the ends 34,36. The longitudinal bore 38 has an inner diameter D defining an inner surface, see FIG. 4. As know to those skilled in the art, the piston 28 or pistons 28 are disposed within the inner surface of the bore 38.

An end wall 40 is disposed on the outer wall 32 at the first end 34 to close an end of the bore 38. In addition, a flange 42 is disposed on the outer wall 32 at the second end 36. As known to those skilled in the art, the flange 42 mounts the master cylinder 22 to the brake booster 24, see FIG. 1.

In this embodiment, the end wall 40 and flange 42 are both integrally formed on the outer wall 32 to define a fully integrated master cylinder 22. Preferably, the integrated master cylinder 22 is formed from an impact extrusion process. In other words, the hollow body 30 is formed from an impact extrusion process with the end wall 40 and flange 42 being integrally formed with the outer wall 32 during the impact extrusion process. As known to those skilled in the art, impact extrusion provides a number of advantages over other processes. In particular, impact extrusion is an efficient and fast process that produces a master cylinder 22 having a smooth hollow body 30 with an integral end wall 40 and flange 42. This reduces the finishing and assembly operations. Impact extrusion also produces a non-porous master cylinder 22 which reduces the likelihood of leaks in the brake system 20. As discussed above in the background section, in order to be impact extruded, the master cylinder 22 must have a compact profile. The subject invention therefore discloses a master cylinder 22 having a compact profile.

Figures 4, 5:
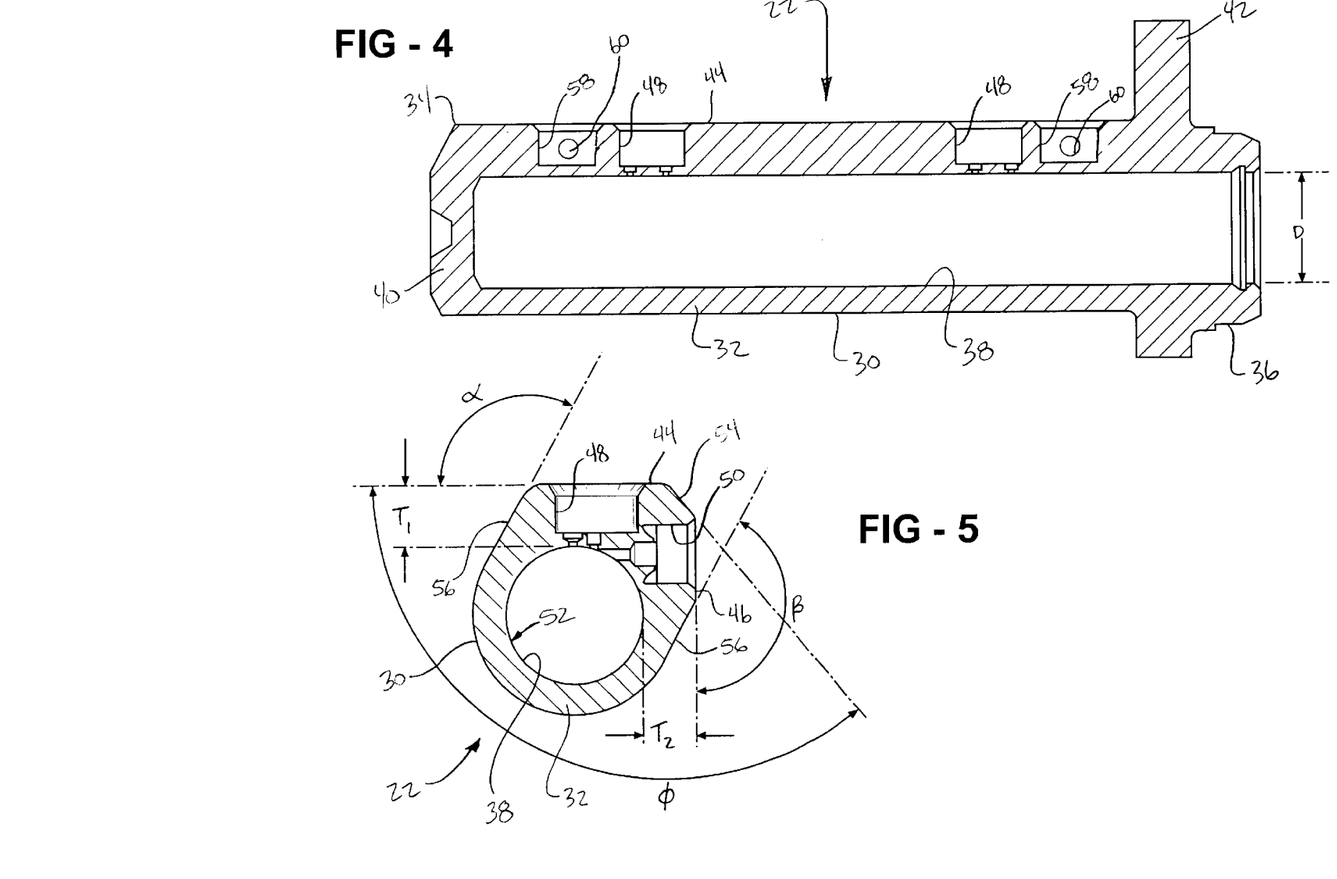
FIG. 4 is a cross-sectional view of the master cylinder taken along line 4—4 of FIG. 3.
FIG. 5 is a cross-sectional view of the master cylinder taken along line 5—5 of FIG. 3.

Referring in particular to FIGS. 4 and 5, the outer wall 32 further defines at least one mounting surface 44,46 on an exterior thereof. Preferably, the outer wall 32 further defines a first mounting surface 44 and a second mounting surface 46 with the first 44 and second 46 mounting surfaces being spaced from each other about the bore 38. At least one aperture 48, 50, 58 is formed within the outer wall 32 in at least one of the mounting surfaces 44,46 to provide fluid communication between the outer wall 32 and the bore 38. The at least one aperture 48,50,58 further includes at least one inlet aperture 48 formed within the outer wall 32 at the first mounting surface 44 and at least one outlet aperture 50 formed within the outer wall 32 at the second mounting surface 46. Preferably, the reservoir 26 is connected to the inlet apertures 48 for providing hydraulic fluid to the master cylinder 22 and outlet fluid lines are connected to the outlet apertures 50 for transferring the hydraulic fluid to the brake cylinders or calipers.

The outer wall 32 further defines at least one thickened section $T_1,T_2$ extending between the inner surface of the bore 38 and one of the mounting surfaces 44,46. Preferably, the outer wall 32 further defines a first thickened section $T_1$ extending between the inner surface of the bore 38 and the first mounting surface 44 and a second thickened section $T_2$ extending between the inner surface of the bore 38 and the second mounting surface 46. The first $T_1$ and second $T_2$ thickened sections are also continuous between the ends 34,36 of the body 30 to define first and second fillets of material. The continuous nature of these first $T_1$ and second $T_2$ thickened sections is facilitated by the impact extrusion process. Although not required, the first $T_1$ and second $T_2$ thickened sections are preferably different from each other. The first $T_1$ and second $T_2$ thickened sections are necessary to provide adequate first 44 and second 46 mounting surfaces for the various components. In particular, there are a pair of the inlet apertures 48 formed within the first thickened section $T_1$, i.e., the first fillet of material, and a pair of the outlet apertures 50 formed within the second thickened section $T_2$, i.e., the second fillet of material. Preferably, the first $T_1$ and second $T_2$ thickened sections (first and second fillets) are spaced 90 degrees apart.

The thickened sections $T_1,T_2$ must be of a particular configuration to maintain the desired compact profile.

Preferably, at least one of the thickened sections $T_1, T_2$ is at least 30 percent smaller than the inner diameter D of the bore 38 for providing the compact profile of the master cylinder 22. More preferably, each of the first $T_1$ and second $T_2$ thickened sections are at least 40 percent smaller than the inner diameter D of the bore 38. Even more preferably, the first $T_1$ and second $T_2$ thickened sections are between 40 and 80 percent smaller than the inner diameter D of the bore 38. The most preferred embodiment has the first $T_1$ and second $T_2$ thickened sections being between 55 and 62 percent smaller than the inner diameter D of the bore 38. The variations in the relative size of the thickened sections $T_1, T_2$ to the inner diameter D of the bore 38 are for different sized master cylinders 22. In one contemplated embodiment, the first $T_1$ and second $T_2$ thickened sections remain constant for each different sized master cylinders 22. Hence, as an example, the first thickened section $T_1$ may be 11.28 mm thick with the second thickened section $T_2$ being 9.78 mm thick. The inner diameter D of the bore 38 could then vary between 20.44 mm to 40.44 mm with 25.44 mm being a preferred size. As such, the ratios between the sizes of the first $T_1$ and second $T_2$ thickened sections to the inner diameter D of the bore 38 can approximately range from 40 to 80 percent smaller with the preferred size ranging from 55 to 62 percent smaller. The following table summarizes these relationships:

| Inner diameter of the Bore | 20.44 mm | 25.44 mm | 40.44 mm |
|---|---|---|---|
| First thickened section (11.28 mm) | 44.8% smaller | 55.66% smaller | 72.1% smaller |
| Second thickened section (9.78 mm) | 52.15% smaller | 61.56% smaller | 75.82% smaller |

As appreciated by those skilled in the art, these dimensions are merely illustrative of one contemplated compact profile. Other dimensions can be used so long a compact profile having a thickened section being at least 30 percent smaller than an inner diameter D of the bore 38 is maintained.

The first $T_1$ and second $T_2$ thickened sections define a first portion of the outer wall 32 and the outer wall 32 includes a second portion 52 of uniform thickness when viewed in cross-section. In the embodiment of FIGS. 2–6B, the second portion 52 is further defined as having a circular configuration of uniform thickness. More preferably, the second portion 52 is defined as having a half-circle configuration of uniform thickness.

The first portion includes a connecting surface 54 between the first 44 and second 46 mounting surfaces and planar surfaces 56 between the first portion and the first 44 and second 46 mounting surfaces. As shown in FIG. 5, transitions between the planar surfaces 56 and the first 44 and second 46 mounting surfaces are at obtuse angles α, β. Similarly, a transition between the connecting surface 54 and the first mounting surface 44 is at an obtuse angle φ.

Figure 6A:
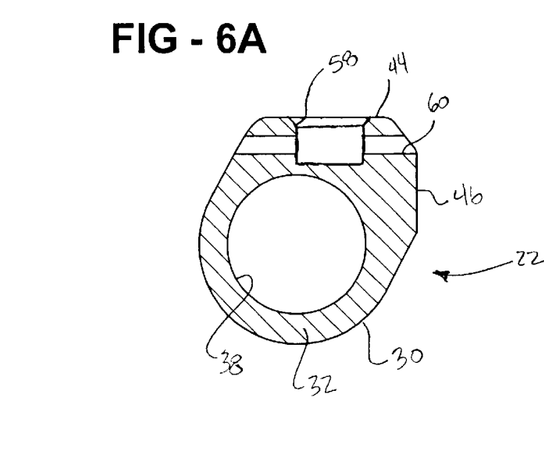
FIG. 6A is a cross-sectional view of the master cylinder taken along line 6A—6A of FIG. 3.
Figure 6B:
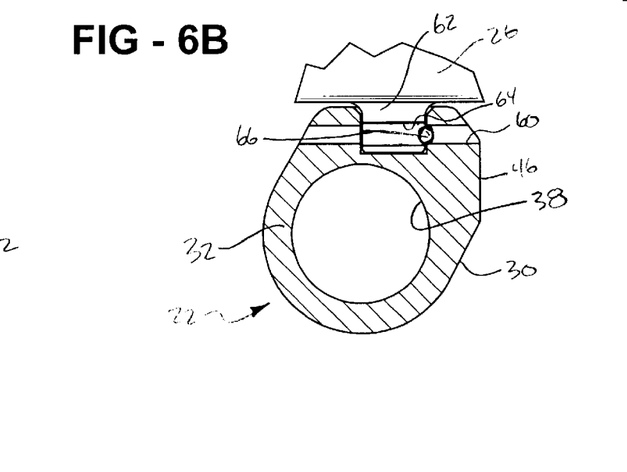
FIG. 6B is a cross-sectional view of the master cylinder similar to FIG. 6A with the reservoir mounted thereto.
Figure 9:
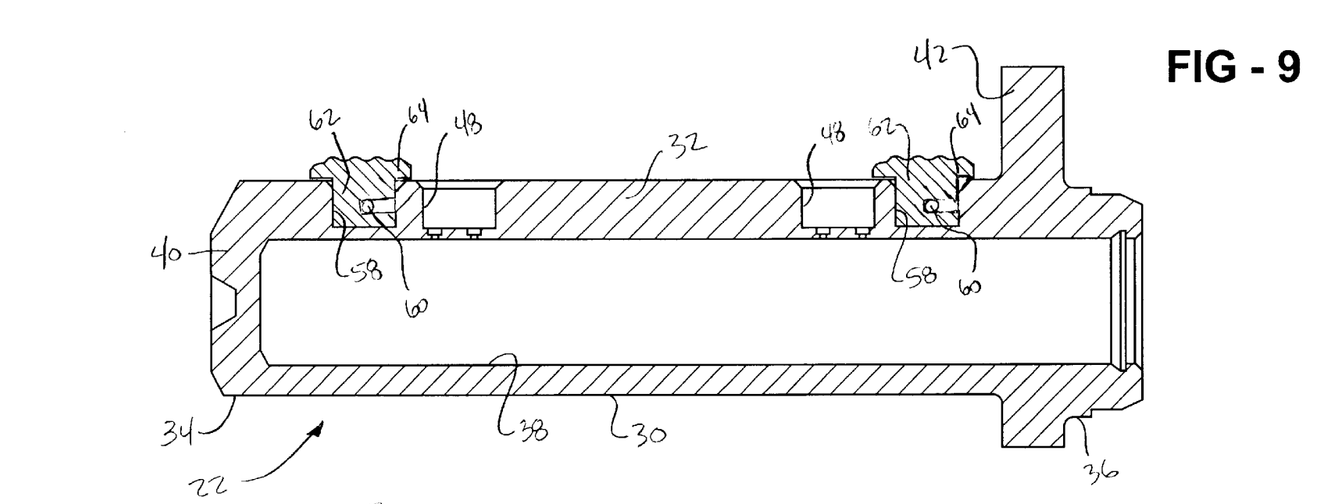
FIG. 9 is a cross-sectional view of the master cylinder similar to FIG. 4 with the reservoir mounted thereto.
Figure 10:
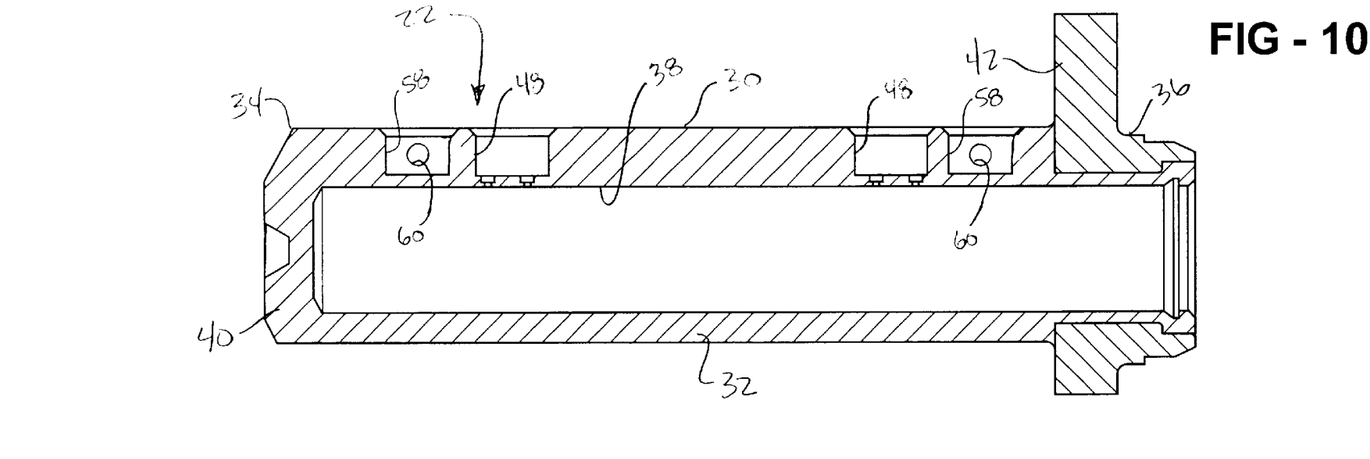
FIG. 10 is a cross-sectional view of an alternative master cylinder having a body with a separately mounted flange.

Referring to FIGS. 2, 3, 6A and 6B, the at least one aperture 48, 50, 58 also further includes at least one mounting aperture 58 formed within the outer wall 32 at the first mounting surface 44. A mounting hole 60 is formed within the first thickened section $T_1$ and preferably passes through a center of the mounting aperture 58. The reservoir 26 is mounted to the body 30 wherein the reservoir 26 includes at least one mounting flange 62 disposed within the mounting aperture 58. The mounting flange 62 includes a notch 64 aligned with the mounting hole 60. A retainer 66, of any suitable design, is disposed within the mounting hole 60 and the notch 64 to secure the reservoir 26 to the body. In particular, the retainer 66 is press fit into the hole 60 and rests at an intersection of the notch 64 and hole 60 to interlock the flange 62 and mounting aperture 58. The retainer 66 can be a ball 66 which is inserted into the mounting hole 60 until the ball 66 aligns with the notch 64 and the mounting hole 60. The ball 66 becomes wedged into position and thereby secures the reservoir 26 to the master cylinder 22 as shown in FIGS. 6B and 9.

Figure 3:
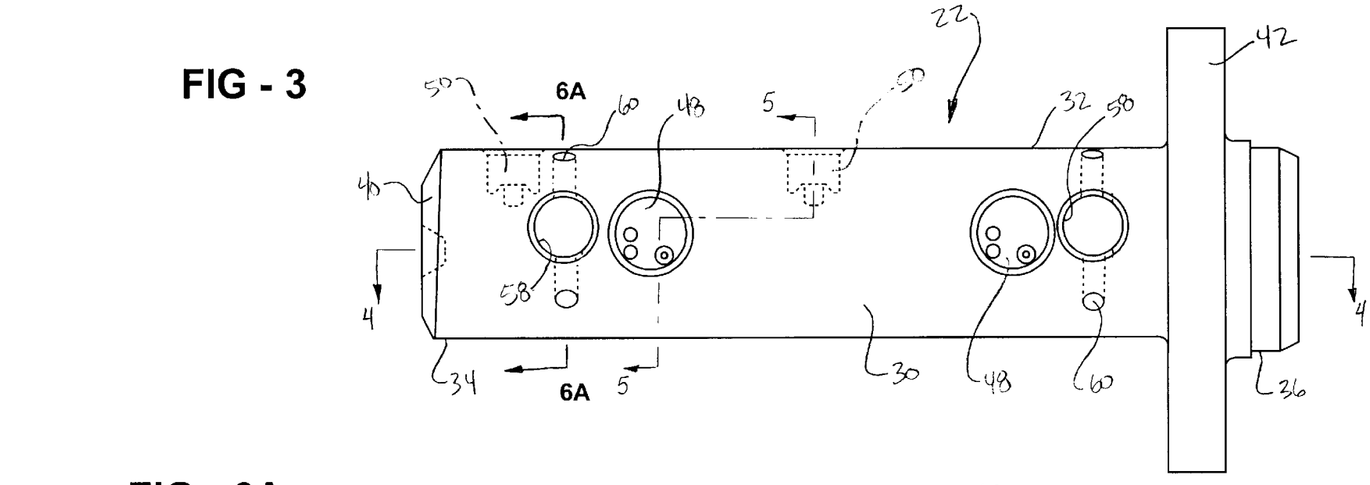
FIG. 3 is a top view of the master cylinder.
Figures 7, 8A, 8B:
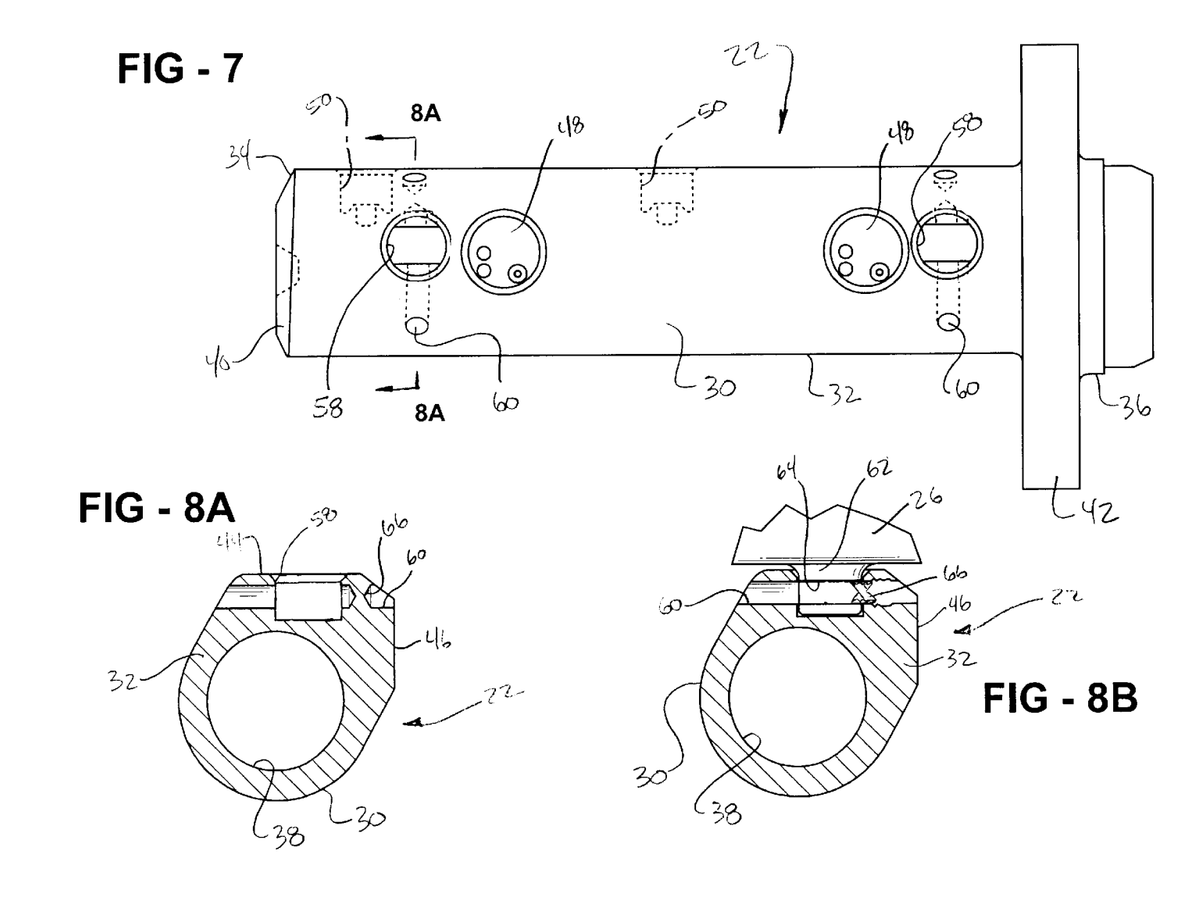
FIG. 7 is a top view of the master cylinder having an alternative mounting aperture.
FIG. 8A is a cross-sectional view of the master cylinder taken along line 8A—8A of FIG. 7.
FIG. 8B is a cross-sectional view of the master cylinder similar to FIG. 8A with the reservoir mounted thereto.

Referring to FIGS. 7–8B, an alternative retainer 66 for the master cylinder 22 is disclosed. In this embodiment, the mounting aperture 58 and the mounting hole 60 are still formed within the outer wall 32 at the first mounting surface 44, i.e., through the first thickened section $T_1$. The mounting aperture 58 may have a circular configuration, such as shown in FIG. 3, or a partially rectangular configuration, such as shown in FIG. 7. The primary difference is that the mounting hole 60 is not completely bored through which leaves a slug 66 integrally formed within the hole 60. The integral position of the slug 66 defines a first condition of the slug 66, see FIG. 8A. The mounting flange 62 is then positioned within the mounting aperture 58. A tool (not shown) can then be used to fracture the slug 66 from the hole 60 and slide the slug 66 into a second condition wedged between the mounting hole 60 and the notch 64 of the flange 62, see FIG. 8B. The reservoir 26 is now securely fastened to the master cylinder 22 as shown in FIGS. 8B and 9.

Referring to FIGS. 10–14, the hollow body 30 of the master cylinder 22 may be alternatively formed from a linear extrusion process were the end wall 40 is integrally formed but the flange 42 is mechanically secured to the outer wall 32 after the body 30 is formed from the linear extrusion process. In addition, the hollow body 30 may be formed by an impact extrusion process were the end wall 40 is integrally formed but the flange 42 is mechanically secured after the impact extrusion process.

Figure 11:
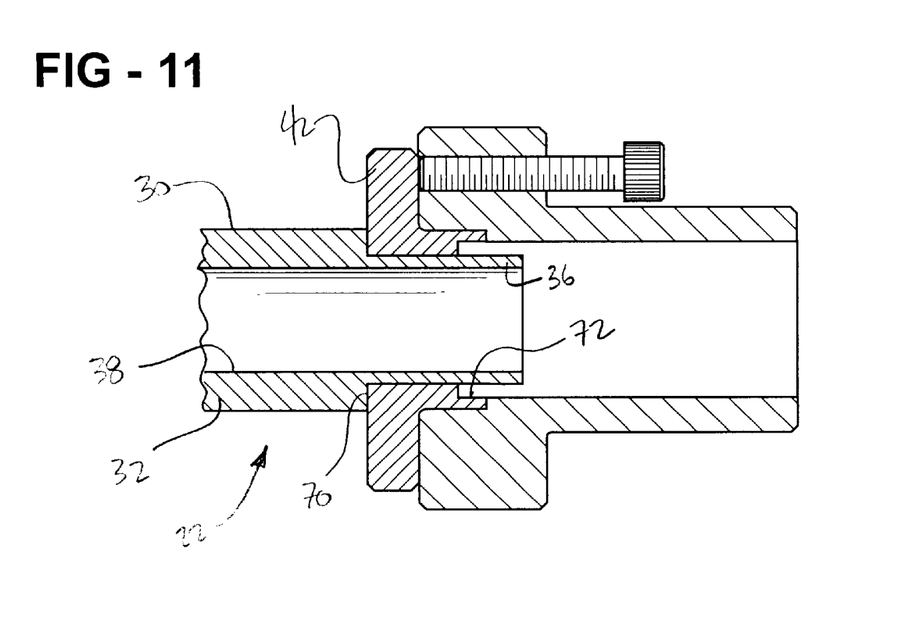
FIG. 11 is a fragmentary cross-sectional view of the master cylinder of FIG. 10 with the flange positioned over the body.
Figure 12:
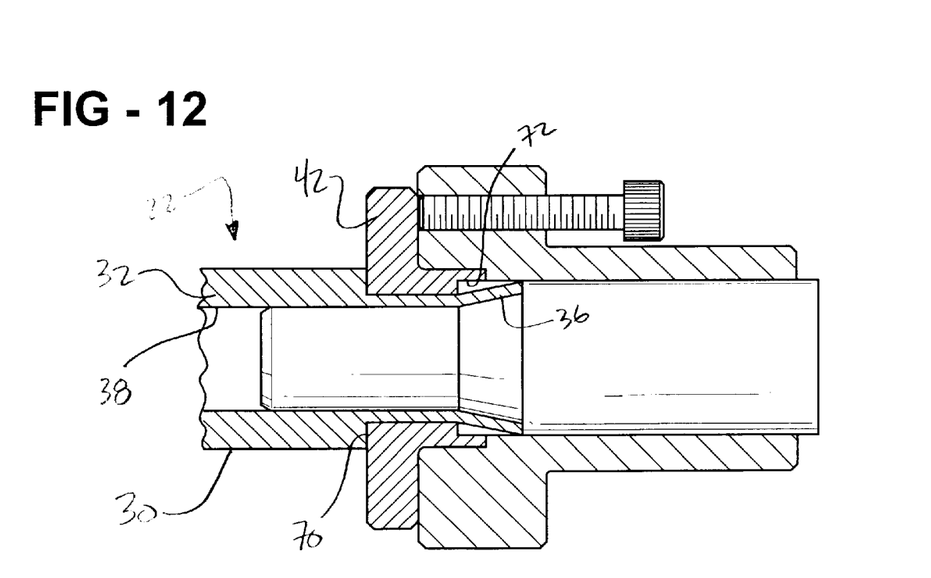
FIG. 12 is a fragmentary cross-sectional view of the master cylinder of FIG. 10 with a punch bending a portion of the body about the flange.
Figure 13:
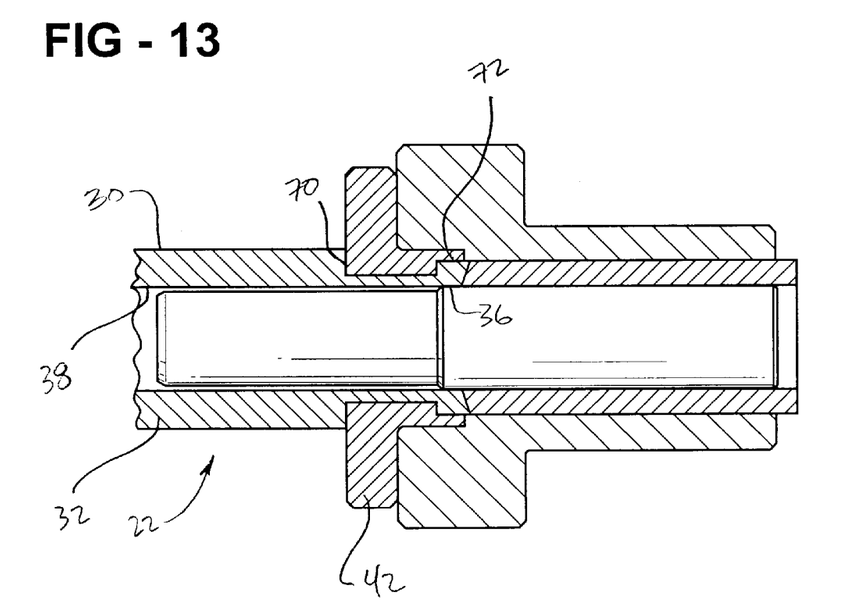
FIG. 13 is a fragmentary cross-sectional view of the master cylinder of FIG. 10 with a punch deforming a portion of the body toward the flange to interlock the flange to the body.
Figure 14:
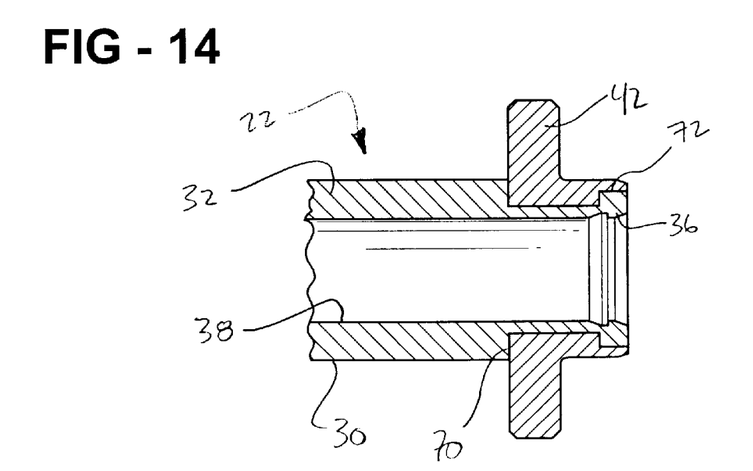
FIG. 14 is a fragmentary cross-sectional view of the master cylinder of FIG. 10.

As best shown in FIGS. 11–13, the flange 42 can be secured to the hollow body 30 by an improved method. In particular, the method of manufacturing the master cylinder 22 having the hollow body 30 with the end wall 40 and the flange 42 comprises the steps of extruding the hollow body 30 to define a continuous outer wall 32 extending between first 34 and second 36 ends having the longitudinal bore 38 formed between the ends 34, 36. Preferably, the step of extruding the hollow body 30 is further defined as forming an exterior step 70 in the continuous outer wall 32. As discussed above, the extruding can be accomplished by either linear or impact extrusion. As also discussed above, the end wall 40 is preferably formed on the first end 34 of the outer wall 32 simultaneously with the extrusion of the hollow body 30 to close an end of the bore 38.

As shown in FIG. 11, the flange 42 is positioned over at least a portion of the second end 36 of the outer wall 32. Preferably, the flange 42 has an interference fit with the body 30. In addition, the step of positioning the flange 42 over the second end 36 of the outer wall 32 is further defined as abutting the flange 42 against the exterior step 70. As shown in FIG. 12, a distal portion of the second end 36 of the outer wall 32 is then deformed. Preferably, the step of deforming the distal portion is further defined as bending the distal portion outwardly toward the flange 42. As shown in FIG. 13, the second end 36 of the outer wall 32 is interlocked with the flange 42 during the deforming of the distal portion to integrally mount the flange 42 to the hollow body 30. Preferably, the flange 42 includes an inner notch 72 and the step of interlocking the second end 36 with the flange 42 is further defined as compressing and deforming the distal portion such that the distal portion extends into the inner notch 72 and interengages the second end 36 of the outer wall 32 to the flange 42. The flange 42 is now securely fastened to the body 30 of the master cylinder 22.

Obviously, many modifications and variations of the present invention are possible in light of the above teachings and the invention may be practiced otherwise than as specifically described within the scope of the appended claims.

What is claimed is:

1. A master cylinder having a compact profile, said master cylinder comprising;
   a hollow body having a continuous outer wall extending between first and second ends to define a longitudinal bore formed between said ends, said outer wall having a continuous thickness between said ends when viewed in cross-section and further defining at least one mounting surface on an exterior thereof, said longitudinal bore having an inner diameter defining an inner surface;
   an end wall integrally formed with said outer wall at said first end to close an end of said bore;
   at least one aperture formed within said outer wall at said mounting surface to provide fluid communication between said outer wall and said bore;
   a flange integrally formed with said outer wall at said second end to define a fully integrated master cylinder; and
   said outer wall further defining at least one thickened section extending between said inner surface of said bore and said mounting surface with said thickened section being at least 30 percent smaller than said inner diameter of said bore for providing the compact profile of said integrated master cylinder.

2. A master cylinder as set forth in claim 1 wherein said integrated master cylinder is formed from an impact extrusion process.

3. A master cylinder as set forth in claim 1 wherein said thickened section is between 40 and 80 percent smaller than said inner diameter of said bore.

4. A master cylinder as set forth in claim 1 wherein said outer wall further defines a first mounting surface and a second mounting surface with said first and second mounting surfaces being spaced from each other about said bore.

5. A master cylinder as set forth in claim 4 wherein said outer wall further defines a first thickened section extending between said inner surface of said bore and said first mounting surface and a second thickened section extending between said inner surface of said bore and said second mounting surface with each of said first and second thickened sections being at least 40 percent smaller than said inner diameter of said bore.

6. A master cylinder as set forth in claim 5 wherein said first and second thickened sections are continuous between said ends of said body.

7. A master cylinder as set forth in claim 5 wherein said first and second thickened sections are different from each other.

8. A master cylinder as set forth in claim 5 wherein said first and second thickened sections define a first portion of said outer wall and said outer wall includes a second portion of uniform thickness when viewed in cross-section.

9. A master cylinder as set forth in claim 8 wherein said second portion is further defined as having a circular configuration of uniform thickness.

10. A master cylinder as set forth in claim 9 wherein said second portion is further defined as having a half-circle configuration of uniform thickness.

11. A master cylinder as set forth in claim 8 wherein said first portion includes a connecting surface between said first and second mounting surfaces and planar surfaces between said first portion and said first and second mounting surfaces.

12. A master cylinder as set forth in claim 11 wherein transitions between said planar surfaces and said first and second mounting surfaces are at obtuse angles.

13. A master cylinder as set forth in claim 11 wherein a transition between said connecting surface and said first mounting surface is at an obtuse angle.

14. A master cylinder as set forth in claim 5 wherein said at least one aperture further includes at least one inlet aperture formed within said outer wall at said first mounting surface and at least one outlet aperture formed within said outer wall at said second mounting surface.

15. A master cylinder as set forth in claim 5 wherein said at least one aperture further includes at least one mounting aperture formed within said outer wall at said first mounting surface.

16. A master cylinder as set forth in claim 15 further including a mounting hole formed within said first thickened section and aligned with said mounting aperture.

17. A master cylinder as set forth in claim 16 further including a reservoir mounted to said body wherein said reservoir includes at least one mounting flange disposed within said mounting aperture.

18. A master cylinder as set forth in claim 17 wherein said mounting flange includes a notch aligned with said mounting hole.

19. A master cylinder as set forth in claim 18 further including a retainer disposed within said mounting hole and said notch to secure said reservoir to said body.

20. A master cylinder as set forth in claim 19 wherein said retainer is further defined as a ball which is inserted into said mounting hole until said ball aligns with said notch and said mounting hole.

21. A master cylinder as set forth in claim 19 wherein said retainer is further defined as a slug having a first condition integrally formed within said mounting hole and a second condition wedged between said mounting hole and said notch.

22. A master cylinder as set forth in claim 5 further including at least one piston disposed within said bore and further including a brake booster with said flange mounted to said brake booster.

23. A method of manufacturing a master cylinder having a hollow body with an end wall and a mounting flange, said method comprising the steps of;
   extruding the hollow body to define a continuous outer wall extending between first and second ends having a longitudinal bore formed between the ends;
   forming the end wall on the first end of the outer wall simultaneously with the extrusion of the hollow body to close an end of the bore;
   positioning the flange over at least a portion of the second end of the outer wall;
   deforming a distal portion of the second end of the outer wall; and
   interlocking the second end of the outer wall with the flange during the deforming of the distal portion to integrally mount the flange to the hollow body.

24. A method as set forth in claim 23 wherein the step of deforming the distal portion is further defined as bending the distal portion outwardly toward the flange.

25. A method as set forth in claim 23 wherein the flange includes an inner notch and wherein the step of interlocking the second end with the flange is further defined as compressing and deforming the distal portion such that the distal portion extends into the inner notch and interengages the second end of the outer wall to the flange.

26. A method as set forth in claim 23 wherein the step of extruding the hollow body is further defined as forming an exterior step in the continuous outer wall and the step of positioning the flange over the second end of the outer wall is further defined as abutting the flange against the exterior step.

27. A method as set forth in claim 23 wherein the step of extruding the hollow body is further defined as extruding the hollow body by a linear extrusion process.

28. A master cylinder having a compact profile, said master cylinder comprising;
a hollow body having a continuous outer wall extending between first and second ends to define a longitudinal bore formed between said ends, said outer wall having a continuous thickness between said ends when viewed in cross-section and further defining at least one mounting surface on an exterior thereof, said longitudinal bore having an inner diameter defining an inner surface;
an end wall disposed on said outer wall at said first end to close an end of said bore;
at least one aperture formed within said outer wall at said mounting surface to provide fluid communication between said outer wall and said bore;
a flange disposed on said outer wall at said second end; and
said outer wall further defining at least one thickened section extending between said inner surface of said bore and said mounting surface with said thickened section being at least 30 percent smaller than said inner diameter of said bore for providing the compact profile of said master cylinder.

29. A master cylinder as set forth in claim 28 wherein said hollow body is formed from a linear extrusion process.

30. A master cylinder as set forth in claim 29 wherein said flange is mechanically secured to said outer wall after said body is formed from said linear extrusion process.

31. A master cylinder as set forth in claim 28 wherein said hollow body is formed from an impact extrusion process.

32. A master cylinder as set forth in claim 31 wherein said end wall is integrally formed with said outer wall during said impact extrusion process.

33. A master cylinder as set forth in claim 32 wherein said flange is integrally formed with said outer wall during said impact extrusion process.

34. A master cylinder as set forth in claim 28 wherein said thickened section is between 40 and 80 percent smaller than said inner diameter of said bore.

35. A master cylinder as set forth in claim 28 wherein said outer wall further defines a first mounting surface and a second mounting surface with said first and second mounting surfaces being spaced from each other about said bore.

36. A master cylinder as set forth in claim 35 wherein said outer wall further defines a first thickened section extending between said inner surface of said bore and said first mounting surface and a second thickened section extending between said inner surface of said bore and said second mounting surface with each of said first and second thickened sections being at least 40 percent smaller than said inner diameter of said bore.

37. A master cylinder as set forth in claim 36 wherein said first and second thickened sections are continuous between said ends of said body.

38. A master cylinder as set forth in claim 36 wherein said first and second thickened sections are different from each other.

39. A master cylinder as set forth in claim 36 wherein said first and second thickened sections define a first portion of said outer wall and said outer wall includes a second portion of uniform thickness when viewed in cross-section.

40. A master cylinder as set forth in claim 39 wherein said second portion is defined as having a half-circle configuration of uniform thickness.

41. A master cylinder as set forth in claim 39 wherein said first portion includes a connecting surface between said first and second mounting surfaces and planar surfaces between said first portion and said first and second mounting surfaces.

42. A master cylinder as set forth in claim 41 wherein transitions between said planar surfaces and said first and second mounting surfaces are at obtuse angles.

43. A master cylinder as set forth in claim 41 wherein a transition between said connecting surface and said first mounting surface is at an obtuse angle.

44. A master cylinder as set forth in claim 35 wherein said at least one aperture further includes at least one inlet aperture formed within said outer wall at said first mounting surface and at least one outlet aperture formed within said outer wall at said second mounting surface.

45. A master cylinder as set forth in claim 35 wherein said at least one aperture further includes at least one mounting aperture formed within said outer wall at said first mounting surface.

46. A master cylinder as set forth in claim 45 further including a mounting hole formed within at least one of said first and second thickened sections and aligned with said mounting aperture.

47. A master cylinder as set forth in claim 46 further including a reservoir mounted to said body wherein said reservoir includes at least one mounting flange isposed within said mounting aperture.

48. A master cylinder as set forth in claim 47 wherein said mounting flange includes a notch aligned with said mounting hole.

49. A master cylinder as set forth in claim 48 further including a retainer disposed within said mounting hole and said notch to secure said reservoir to said body.

50. A master cylinder as set forth in claim 49 wherein said retainer is further defined as a ball which is inserted into said mounting hole until said ball aligns with said notch and said mounting hole.

51. A master cylinder as set forth in claim 49 wherein said retainer is further defined as a slug having a first condition integrally formed within said mounting hole and a second condition wedged between said mounting hole and said notch.

52. A master cylinder as set forth in claim 35 further including at least one piston disposed within said bore and further including a brake booster with said flange mounted to said brake booster.

* * * * *